United States Patent
Sandlin et al.

(10) Patent No.: US 9,563,446 B2
(45) Date of Patent: Feb. 7, 2017

(54) BINARY FILE GENERATION

(71) Applicant: Microsoft Technology Licensing, LLC, Redmond, WA (US)

(72) Inventors: Neil Sandlin, Woodinville, WA (US); Philippe Joubert, Kirkland, WA (US); Patrick J. Leahy, Redmond, WA (US); Kenneth M. Jung, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/701,064

(22) Filed: Apr. 30, 2015

(65) Prior Publication Data

US 2016/0321089 A1 Nov. 3, 2016

(51) Int. Cl.
 *G06F 9/44* (2006.01)
 *G06F 9/445* (2006.01)
 *G06F 9/45* (2006.01)

(52) U.S. Cl.
 CPC ............ *G06F 9/44521* (2013.01); *G06F 8/40* (2013.01); *G06F 9/44505* (2013.01)

(58) Field of Classification Search
 None
 See application file for complete search history.

(56) References Cited

U.S. PATENT DOCUMENTS

| 5,903,753 | A | 5/1999 | Bramnick et al. |
| 6,484,309 | B2 | 11/2002 | Nowlin, Jr. et al. |
| 6,658,658 | B1 | 12/2003 | Jones et al. |
| 7,533,101 | B2 | 5/2009 | Bond et al. |
| 7,793,306 | B2 | 9/2010 | Vasudevan et al. |
| 2002/0078262 | A1 | 6/2002 | Harrison et al. |
| 2002/0199180 | A1 | 12/2002 | Donaldson et al. |
| 2004/0255106 | A1 | 12/2004 | Rothman et al. |
| 2009/0293057 | A1* | 11/2009 | Larkin ................ G06F 9/468 718/1 |

(Continued)

FOREIGN PATENT DOCUMENTS

EP 1739553 A2 1/2007

OTHER PUBLICATIONS

International Search Report for PCT application No. PCT/US2016/026308 mailed date Jul. 5, 2016, pp. 13.

(Continued)

*Primary Examiner* — Andy Ho
*Assistant Examiner* — Abdou Seye
(74) *Attorney, Agent, or Firm* — John Jardine; Dan Choi; Micky Minhas

(57) ABSTRACT

Various systems and methods for generating a mapping binary file are described herein. In one example, a method includes mapping a function call from a legacy binary file to a function call from a virtualized namespace binary file using a builder to detect a build file that enables the mapping, the mapping comprising merging an export table from the legacy binary file and an export table from the virtualized namespace binary file. The method can also include storing the mapping of the function call from the legacy binary file to the function call from the virtualized namespace binary file in a mapping binary file and storing, in the mapping binary file, an exception detected from the combination. Furthermore, the method can include storing the mapping binary file in a storage location accessible by a loader.

16 Claims, 12 Drawing Sheets

(56) References Cited

U.S. PATENT DOCUMENTS

| | | |
|---|---|---|
| 2011/0154378 A1 | 6/2011 | Kishan et al. |
| 2012/0222025 A1 | 8/2012 | Pandit |
| 2012/0227061 A1 | 9/2012 | Hunt et al. |
| 2012/0246634 A1 | 9/2012 | Wright et al. |
| 2013/0275943 A1 | 10/2013 | Namjoshi et al. |

OTHER PUBLICATIONS

"Forwarder Dynamic Link Libraries as a Method for Servicing Software", IBM Technical Disclosure Bulletin, International Business Machines Corp. (Thornwood), US, vol. 38. No. 11, Nov. 1995 (Nov. 1995), p. 407-408, /xP000547408, ISSN: 0018-8689 the whole document.

Callaham, John, "What is Windows OneCore and What Does it Mean for the Future of Microsoft?", Published on: Jul. 21, 2014 Available at: http://www.windowscentral.com/windows-onecore-shows-some-microsoft-linkedin-pages.

"General-Purpose I/O (GPIO) Drivers", Retrieved on: Apr. 2, 2015 Available at: https://msdn.microsoft.com/es-es/library/hh439508(v=vs.85).aspx.

Winhec", Retrieved on: Apr. 2, 2015, 42 pages. http://www.google.co.in/url?sa=t&rct=j&q=&esrc=s&frm=1&source=web&cd=2&cad=rja&uact=8&ved=0CCcqFjAB&url=http%3A%2F%2Fvideo.ch9.ms%2Fsessions%2Fwinhec%2F2015%2Ffiles%2FDDF102%2520-%2520Understanding%2520the%2520Tools%2520for%2520Windows%2520Driver%2520Developement.pptx&ei=gCciVZf3AcJuASe04GIDg&usg=AFQjCNHr8XVxu602CEWX-rxmrfrLheK7tg&sig2=GAx0w5dUcg6xCUXgFraM0w&bvm=bv.89947451,d.c2E.

\* cited by examiner

BINARY FILE GENERATION

BACKGROUND

Computers can be programmed to perform any suitable number of functions. Frequently, the computers are programmed to execute various functions with software components that interact to produce a result.

The software components may be initially stored in some form of nonvolatile memory, such as a hard disk. Nonvolatile memory can provide persistent storage for a large amount of computer software and data used in operating a computer. However, a conventional computer system traditionally does not execute software components directly from non-volatile memory. The non-volatile memory may be too slow to allow access to instructions and data as the computer operates.

Accordingly, a conventional computer may "load" software components before they are executed so that they can use fast memory. Frequently, some software is loaded each time a computer is powered up. However, not all software is loaded at power up. For example, a computer may be programmed with more software than is used at one time. Accordingly, it is known to dynamically load software components. These components are stored as a file containing computer executable instructions in a form that can be executed without compiling. These files also may be called "binaries" or "executables."

Loading is done by a component of an operating system, called a "loader." The loader performs multiple operations that are needed to make a binary ready for execution, including allocating fast memory to store computer-executable instructions that make up the binary. The loader may also trigger allocation of fast memory to store data accessed by the binary.

A binary may implement multiple functions, sometimes referred to as a library of functions. The functions implemented in a binary may be defined in an "interface contract." The interface contract defines application programming interfaces (APIs) that can be used to access the functions in the library. The library may be said to "export" or "publish" that interface contract through an "export address table." Other components may be said to "consume" or "import" the interface contract. Once the binary is loaded, the consuming components can access, or link to, all of the functions in the library by accessing the functions using interfaces defined in the interface contract. For this reason, a software component that is loaded in this fashion may be called a "dynamically linked library."

Because the interface contract for a component is known in advance, components consuming the interface contract can be written using APIs defined by that contract so that they can interact with the library. Each dynamically linked library may include an import address table that identifies other dynamically linked libraries that it consumes, which are sometimes referred to as dependent dynamically linked libraries. When one dynamically linked library is loaded, a loader may be said to "resolve" the interface contracts between two binaries by matching the entries of one binary's import table to the exports of another binary's export table. Though, a loader may defer loading dependent binaries until a later time, such as when the dependent binaries are actually accessed, sometimes referred to as "delay loading."

In some cases, an export table entry for a dynamically linked library may contain a pointer to the export of another dynamically linked library. This is sometimes referred to as a "forwarder" or a "forwarded export". The loader resolves a forwarded export by reading the export address table of the binary in question and from that export table, retrieving the name and interface name of the binary pointed to by the export address table.

SUMMARY

The following presents a simplified summary in order to provide a basic understanding of some aspects described herein. This summary is not an extensive overview of the claimed subject matter. This summary is not intended to identify key or critical elements of the claimed subject matter nor delineate the scope of the claimed subject matter. This summary's sole purpose is to present some concepts of the claimed subject matter in a simplified form as a prelude to the more detailed description that is presented later.

An embodiment provides a system for generating a mapping binary file comprising a translator to map a function call from a legacy binary file to a function call from a virtualized namespace binary file by merging an export table from the legacy binary file and an export table from the virtualized namespace binary file. The system can also include a binary creator to store the mapping of the function call from the legacy binary file to the function call from the virtualized namespace binary file in a mapping binary file and store, in the mapping binary file, an exception detected from the merger of the export tables. Furthermore, the binary creator can store the mapping binary file in a storage location accessible by a loader.

Another embodiment provides a method for generating a mapping binary file comprising mapping a function call from a legacy binary file to a function call from a virtualized namespace binary file using a builder to detect a build file that enables the mapping, the mapping comprising merging an export table from the legacy binary file and an export table from the virtualized namespace binary file. The method can also include storing the mapping of the function call from the legacy binary file to the function call from the virtualized namespace binary file in a mapping binary file and storing, in the mapping binary file, an exception detected from the combination. Furthermore, the method can include storing the mapping binary file in a storage location accessible by a loader.

Additionally, an embodiment provides one or more computer-readable storage media for generating a mapping binary file comprising a plurality of instructions that, when executed by a processor, cause the processor to map a function call from a legacy binary file to a function call from a virtualized namespace binary file by merging an export table from the legacy binary file and an export table from the virtualized namespace binary file. The plurality of instructions, when executed by the processor, also cause the processor to store the mapping of the function call from the legacy binary file to the function call from the virtualized namespace binary file in a mapping binary file and store, in the mapping binary file, an exception detected from the combination. Furthermore, the plurality of instructions that, when executed by a processor, cause the processor to store the mapping binary file in a binary mapping directory accessible by a loader along with a registry value indicating a location of the binary mapping directory.

Another embodiment provides a system for executing a process comprising a configurator to store a registry value indicating a binary mapping directory. The system also includes a loader to search the binary mapping directory corresponding to the registry value when loading a process for execution and load the mapping binary file from the binary mapping directory into the process. The loader can also load a virtualized namespace binary file.

In yet another embodiment, a method for executing a process comprises storing a registry value indicating a binary mapping directory and searching the binary mapping directory corresponding to the registry value when loading a process for execution. The method also includes loading the mapping binary file from the binary mapping directory into the process, and loading a virtualized namespace binary file corresponding to the mapping binary file.

Furthermore, another embodiment provides a system for implementing namespace virtualization with a legacy application comprising a loader to detect that an interface contract in the legacy application is to be resolved. The system also includes a binary executable to detect an import table associated with the interface contract from a plurality of import tables. In addition, the loader can select one or more dynamically linked libraries that collectively implement the interface contract based at least in part on an interface name and/or a legacy binary indicator stored in the detected import table and load the one or more selected dynamically linked libraries into an executable file for execution.

Moreover, another embodiment provides a method for implementing namespace virtualization with a legacy application comprising detecting that an interface contract in a legacy binary file corresponding to the legacy application is to be resolved. The method also includes detecting an import table associated with the interface contract from a plurality of import tables and selecting one or more dynamically linked libraries that collectively implement the interface contract based at least in part on an interface name and/or a legacy binary indicator stored in the detected import table. Furthermore, the method includes loading a function in the interface contract from the one or more selected dynamically linked libraries, the function being loaded into an executable file for execution.

BRIEF DESCRIPTION OF THE DRAWINGS

The following detailed description may be better understood by referencing the accompanying drawings, which contain specific examples of numerous features of the disclosed subject matter.

DETAILED DESCRIPTION

Many operating systems attempt to maintain application compatibility between subsequent releases of an operating system. Furthermore, many operating systems attempt to maintain some level of application compatibility between closely related, yet different operating systems. However, the introduction of API namespace virtualization can prevent application compatibility between different versions of an operating system or different operating systems.

The techniques described herein include a set of dynamically linked libraries that may contain forwarded exports ("the forwarders" or "mapping binary files") that establish a translation between an immutable reference API namespace ("legacy reference namespace") and a per-operating system virtualized namespace ("virtualized namespace"). An application can be linked once for the reference namespace and the forwarders can provide a mapping between the two namespaces at runtime. The forwarders or mapping binary files enable a legacy application that does not support namespace virtualization to be executed on a device that supports namespace virtualization.

Figure 1:
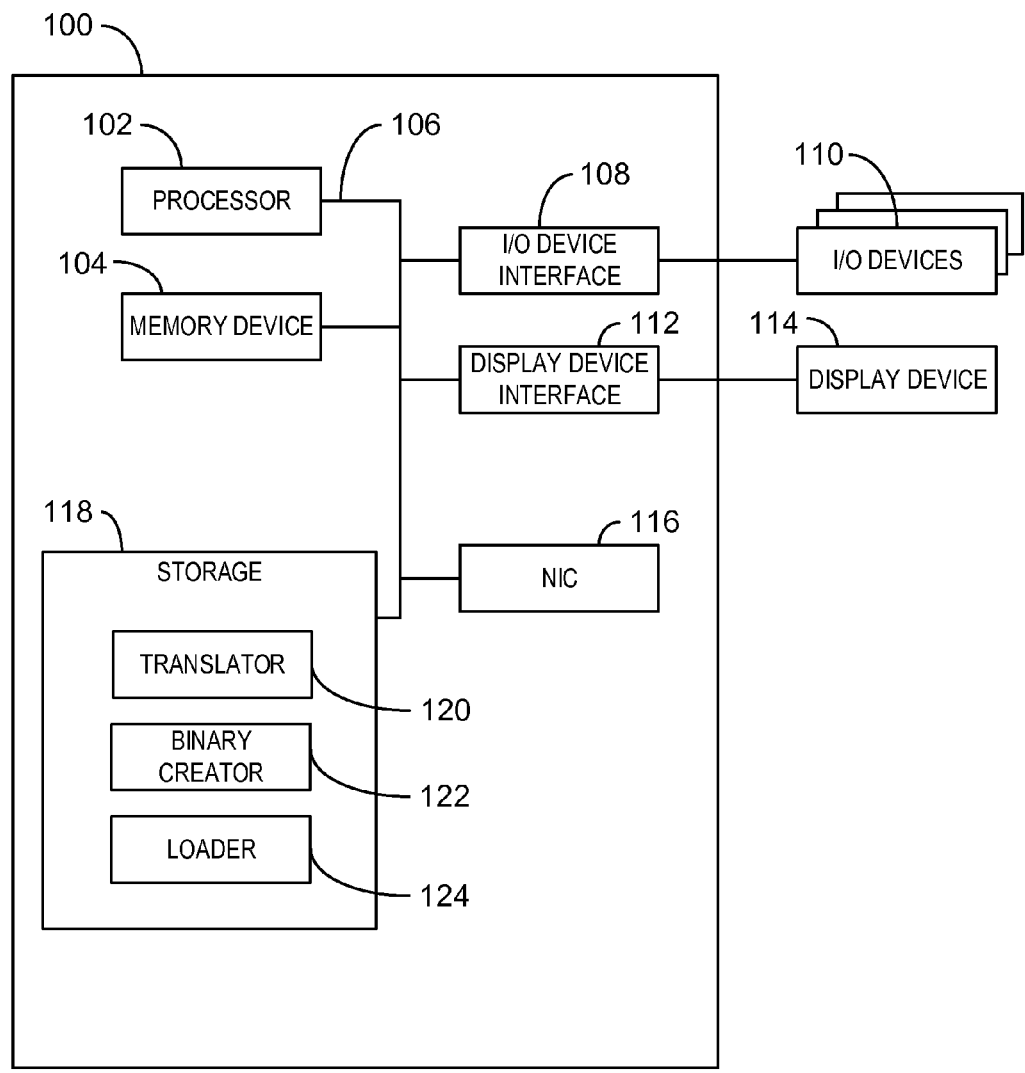
FIG. 1 is a block diagram of an example of a computing system that can generate a mapping binary file.
Figure 7:
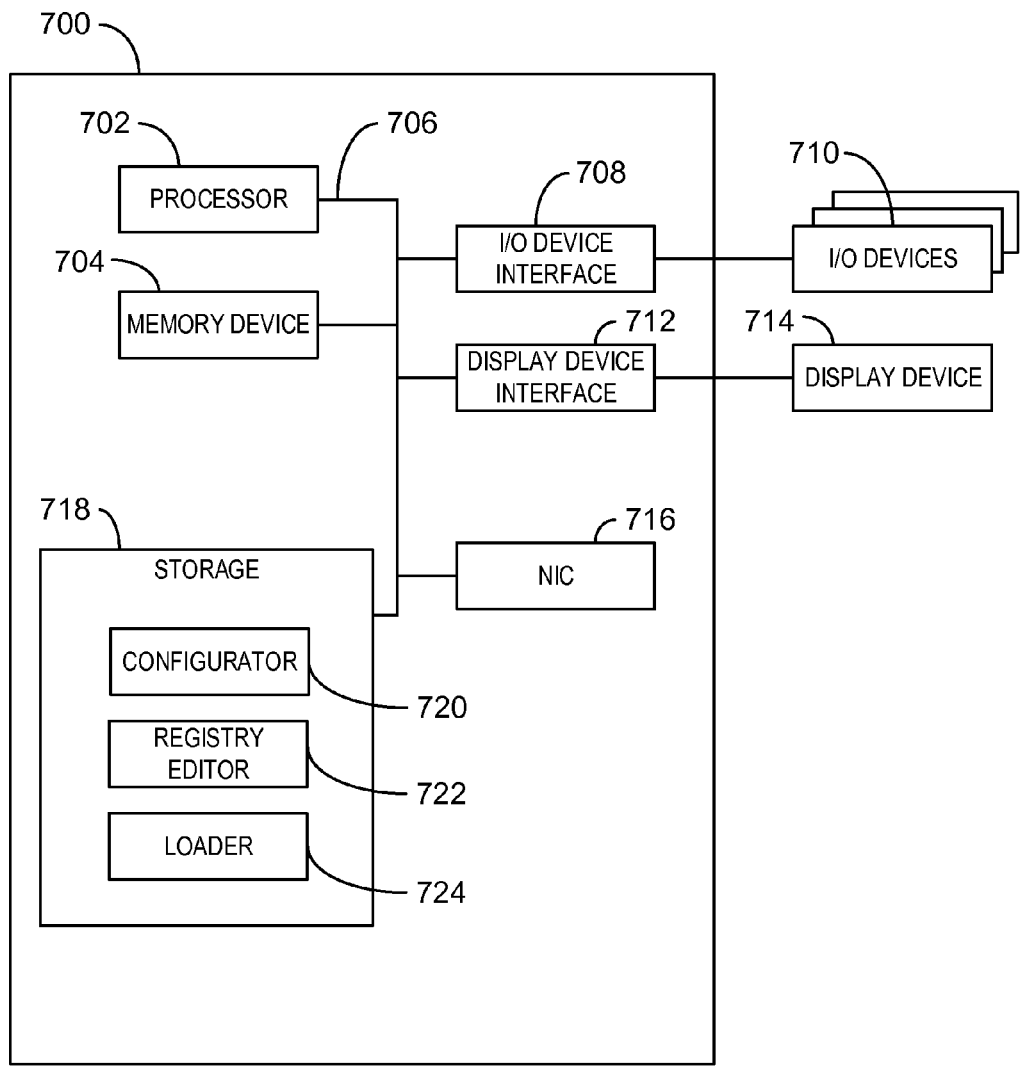
FIG. 7 is a block diagram of an example of a computing system that can execute a process.
Figure 9:
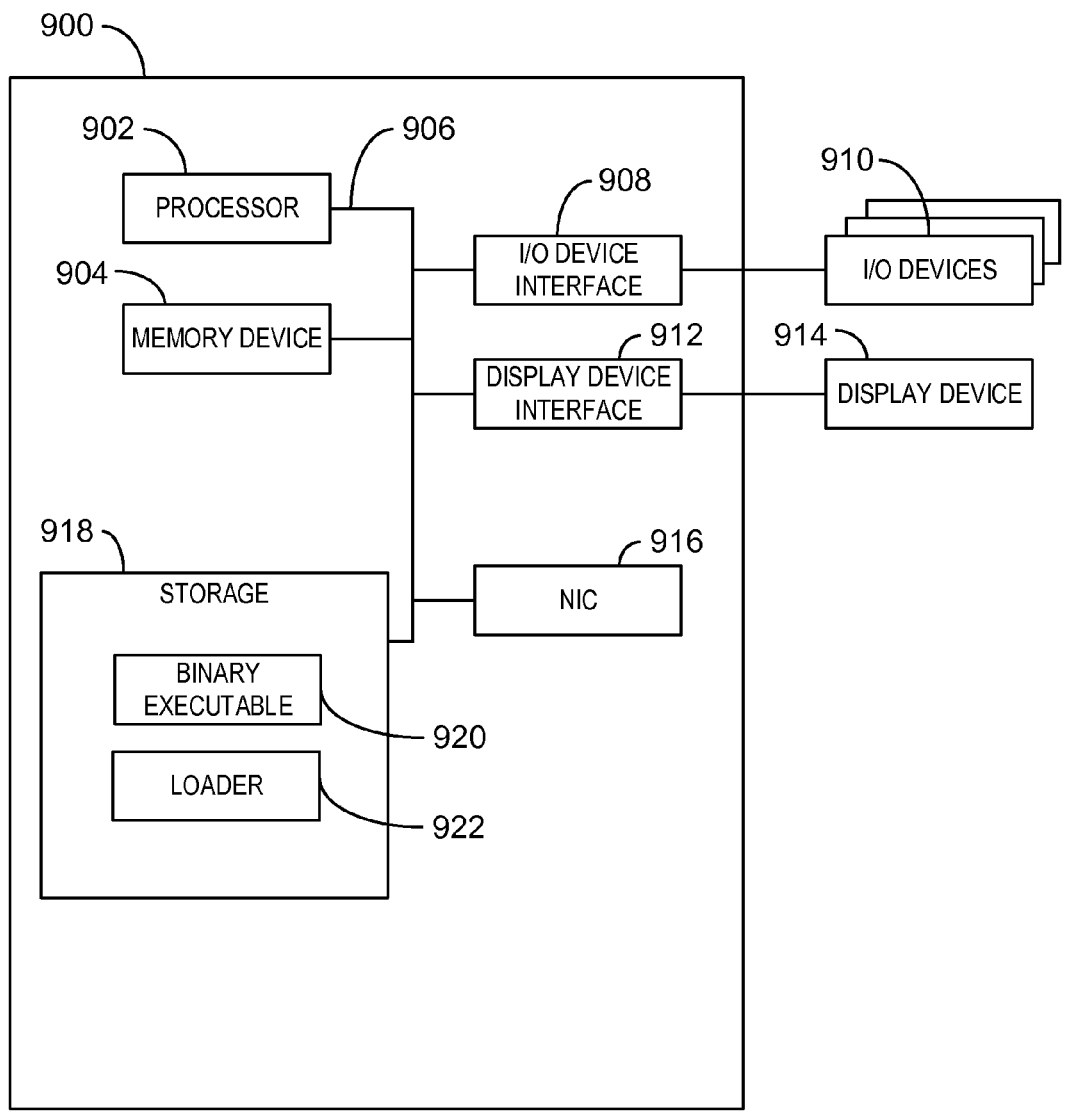
FIG. 9 is a is a block diagram of an example of a computing system that can implement namespace virtualization with a legacy application.

As a preliminary matter, some of the figures describe concepts in the context of one or more structural components, referred to as functionalities, modules, features, elements, etc. The various components shown in the figures can be implemented in any manner, for example, by software, hardware (e.g., discrete logic components, etc.), firmware, and so on, or any combination of these implementations. In one embodiment, the various components may reflect the use of corresponding components in an actual implementation. In other embodiments, any single component illustrated in the figures may be implemented by a number of actual components. The depiction of any two or more separate components in the figures may reflect different functions performed by a single actual component. FIGS. 1, 7, and 9 discussed below, provide details regarding different systems that may be used to implement the functions shown in the figures.

Other figures describe the concepts in flowchart form. In this form, certain operations are described as constituting distinct blocks performed in a certain order. Such implementations are exemplary and non-limiting. Certain blocks described herein can be grouped together and performed in a single operation, certain blocks can be broken apart into plural component blocks, and certain blocks can be performed in an order that differs from that which is illustrated herein, including a parallel manner of performing the blocks. The blocks shown in the flowcharts can be implemented by software, hardware, firmware, and the like, or any combination of these implementations. As used herein, hardware may include computer systems, discrete logic components, such as application specific integrated circuits (ASICs), and the like, as well as any combinations thereof.

As for terminology, the phrase "configured to" encompasses any way that any kind of structural component can be constructed to perform an identified operation. The structural component can be configured to perform an operation using software, hardware, firmware and the like, or any combinations thereof.

The term "logic" encompasses any functionality for performing a task. For instance, each operation illustrated in the flowcharts corresponds to logic for performing that operation. An operation can be performed using software, hardware, firmware, etc., or any combinations thereof.

As utilized herein, terms "component," "system," "client" and the like are intended to refer to a computer-related entity, either hardware, software (e.g., in execution), and/or firmware, or a combination thereof. For example, a component can be a process running on a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any tangible, computer-readable device, or media.

Computer-readable storage media can include but are not limited to magnetic storage devices (e.g., hard disk, floppy disk, and magnetic strips, among others), optical disks (e.g., compact disk (CD), and digital versatile disk (DVD), among others), smart cards, and flash memory devices (e.g., card, stick, and key drive, among others). In contrast, computer-readable media generally (i.e., not storage media) may additionally include communication media such as transmission media for wireless signals and the like.

FIG. 1 is a block diagram of an example of a computing system that can generate a mapping binary file. The computing system 100 may be, for example, a mobile phone, laptop computer, desktop computer, or tablet computer, among others. The computing system 100 may include a processor 102 that is adapted to execute stored instructions, as well as a memory device 104 that stores instructions that are executable by the processor 102. The processor 102 can be a single core processor, a multi-core processor, a computing cluster, or any number of other configurations. The memory device 104 can include random access memory (e.g., SRAM, DRAM, zero capacitor RAM, SONOS, eDRAM, EDO RAM, DDR RAM, RRAM, PRAM, etc.), read only memory (e.g., Mask ROM, PROM, EPROM, EEPROM, etc.), flash memory, or any other suitable memory systems. The instructions that are executed by the processor 102 may be used to generate a mapping binary file.

The processor 102 may be connected through a system bus 106 (e.g., PCI, ISA, PCI-Express, NuBus, etc.) to an input/output (I/O) device interface 108 adapted to connect the computing system 100 to one or more I/O devices 110. The I/O devices 110 may include, for example, a keyboard, a gesture recognition input device, a voice recognition device, and a pointing device, wherein the pointing device may include a touchpad or a touchscreen, among others. The I/O devices 110 may be built-in components of the computing system 100, or may be devices that are externally connected to the computing system 100.

The processor 102 may also be linked through the system bus 106 to a display device interface 112 adapted to connect the computing system 100 to a display device 114. The display device 114 may include a display screen that is a built-in component of the computing system 100. The display device 114 may also include a computer monitor, television, or projector, among others, that is externally connected to the computing system 100. A network interface card (NIC) 116 may also be adapted to connect the computing system 100 through the system bus 106 to a network (not depicted).

The storage 118 can include a hard drive, an optical drive, a USB flash drive, an array of drives, or any combinations thereof. The storage 118 may include a translator 120, a binary creator 122, and a loader 124. In some embodiments, the translator 120 can map a function call from a legacy binary file to a function call from a virtualized namespace binary file. For example, the translator 120 can merge an export table from the legacy binary file and an export table from the virtualized namespace binary file. As discussed above, an export table can indicate any suitable number of functions accessible by a binary file such as a dynamically linked library. In some examples, merging the export table from the legacy binary file and the export table from the virtualized namespace binary file includes associating a function call from the legacy binary file with an application programming interface accessible by the virtualized namespace binary file.

The binary creator 122 can store the mapping of the function call from the legacy binary file to the function call from the virtualized namespace binary file in a mapping binary file. For example, the mapping or relationship between a function call from the legacy binary file and an application programming interface accessible by the virtualized namespace binary file can be stored in the mapping binary file. The binary creator 122 can also store, in the mapping binary file, an exception detected from the merger of export tables. For example, an exception may indicate that a function call in a legacy binary file is not associated with a virtualized namespace. Additionally, in some embodiments, the loader 124 can store the mapping binary file in a storage location accessible by a loader. For example, a storage location, such as a file directory, can store any suitable number of mapping binary files. In some embodiments, the loader 124 can execute an application by loading the mapping binary file and a virtualized namespace binary file corresponding to the mapping binary file.

It is to be understood that the block diagram of FIG. 1 is not intended to indicate that the computing system 100 is to include all of the components shown in FIG. 1. Rather, the computing system 100 can include fewer or additional components not illustrated in FIG. 1 (e.g., additional applications, additional modules, additional memory devices, additional network interfaces, etc.). For example, the computing system 100 can also include a builder to detect a build file that enables the mapping and a configurator to store a registry value indicating a binary mapping directory. Furthermore, any of the functionalities of the translator 120, binary creator 122, and loader 124 may be partially, or entirely, implemented in hardware and/or in the processor 102. For example, the functionality may be implemented with an application specific integrated circuit, in logic implemented in the processor 102, or in any other device.

Figure 2:
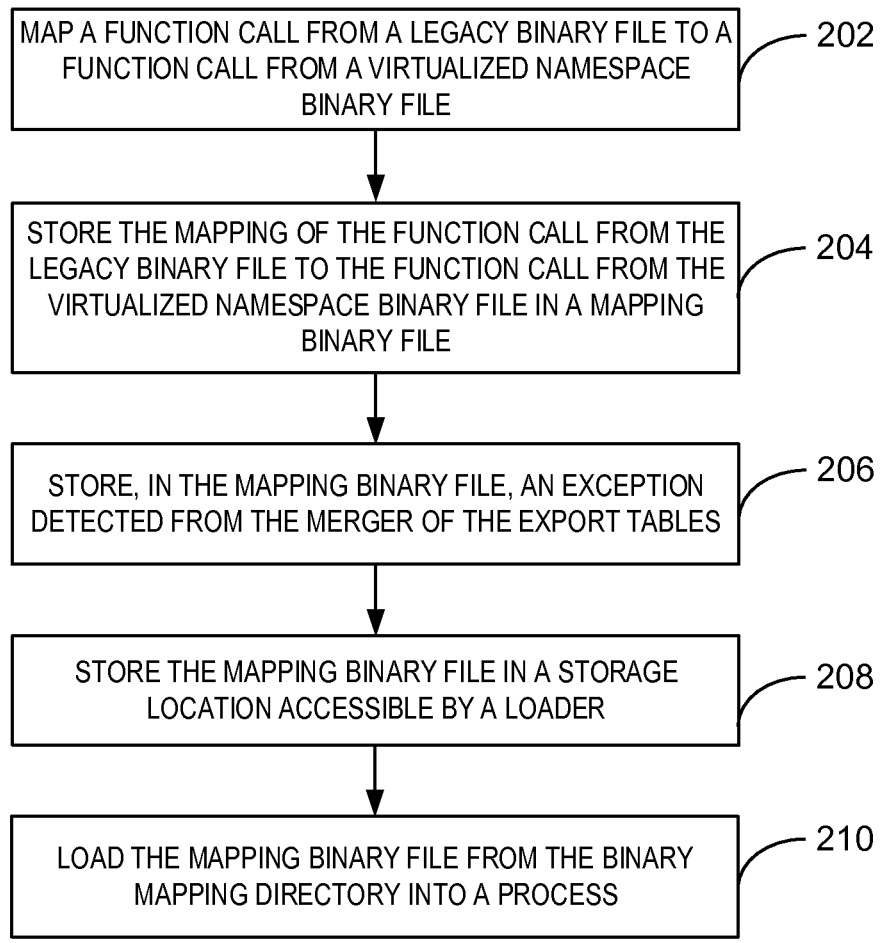
FIG. 2 is a process flow diagram of an example method for generating a mapping binary file.

FIG. 2 is a process flow diagram of an example method for generating a mapping binary file. The method 200 can be implemented with any suitable computing device, such as the computing system 100 of FIG. 1.

At block 202, the translator 120 can map a function call from a legacy binary file to a function call from a virtualized namespace binary file by merging an export table from the legacy binary file and an export table from the virtualized namespace binary file. As discussed above, a legacy binary file may not support virtualized namespace function calls. Accordingly, the translator 120 can associate a function call from a legacy binary file with a function call from an application programming interface supported by a virtualized namespace binary file. In some embodiments, any suitable application programming interface can be associated with a function in a legacy binary file.

At block 204, the binary creator 122 can store the mapping of the function call from the legacy binary file to the function call from the virtualized namespace binary file in a mapping binary file. The mapping binary file can include any suitable number of mappings or associations between functions from legacy binary files and virtualized namespace binary files. In some embodiments, the mapping binary file can include any suitable data structure, such as an export table, among others, and each function call from a legacy binary file can be stored with the associated function call from an application programming interface supported by a virtualized namespace binary file.

At block 206, the binary creator 122 can store, in the mapping binary file, an exception detected from the merger of the export tables. For example, the binary creator 122 can detect that a function call from a legacy binary file may not have a corresponding function call in an application programming interface supported by a virtualized namespace binary file. Accordingly, the binary creator 122 may store an error indicator with the function call from the legacy binary file to indicate that the function call from the legacy binary file cannot be performed by a virtualized namespace binary file.

At block 208, the binary creator 122 can store the mapping binary file in a storage location accessible by a loader. In some embodiments, the loader 124 can store any suitable number of mapping binary files. In some examples, the loader 124 can indicate that the mapping binary file is to be loaded by the function call from the legacy binary file rather than loading a function call from a separate dependent legacy binary file.

At block 210, the loader 124 can load the mapping binary file from the binary mapping directory into the process at runtime. For example, the loader 124 can load the mapping binary file in order to execute an application at runtime. In some embodiments, the loader can detect a precedential binary file ordering that indicates a system binary file is to be loaded prior to the mapping binary file. For example, the loader 124 can load a function from a system binary file when available and load a function from the mapping binary file when the function is not available in the system binary file. Additional details regarding loading a mapping binary file from a storage location are included below in relation to FIGS. 7-8.

In one embodiment, the process flow diagram of FIG. 2 is intended to indicate that the steps of the method 200 are to be executed in a particular order. Alternatively, in other embodiments, the steps of the method 200 can be executed in any suitable order and any suitable number of the steps of the method 200 can be included. Further, any number of additional steps may be included within the method 200, depending on the specific application. In some embodiments, the translator 120 can also detect a second function call to be mapped from the legacy binary file to the virtualized namespace binary file, determine that the mapping of the second function call does not exist, and generate a substitute implementation for the second function call. In some embodiments, the substitute implementation can include returning an error code indicating the second function call cannot be performed.

Figure 3:
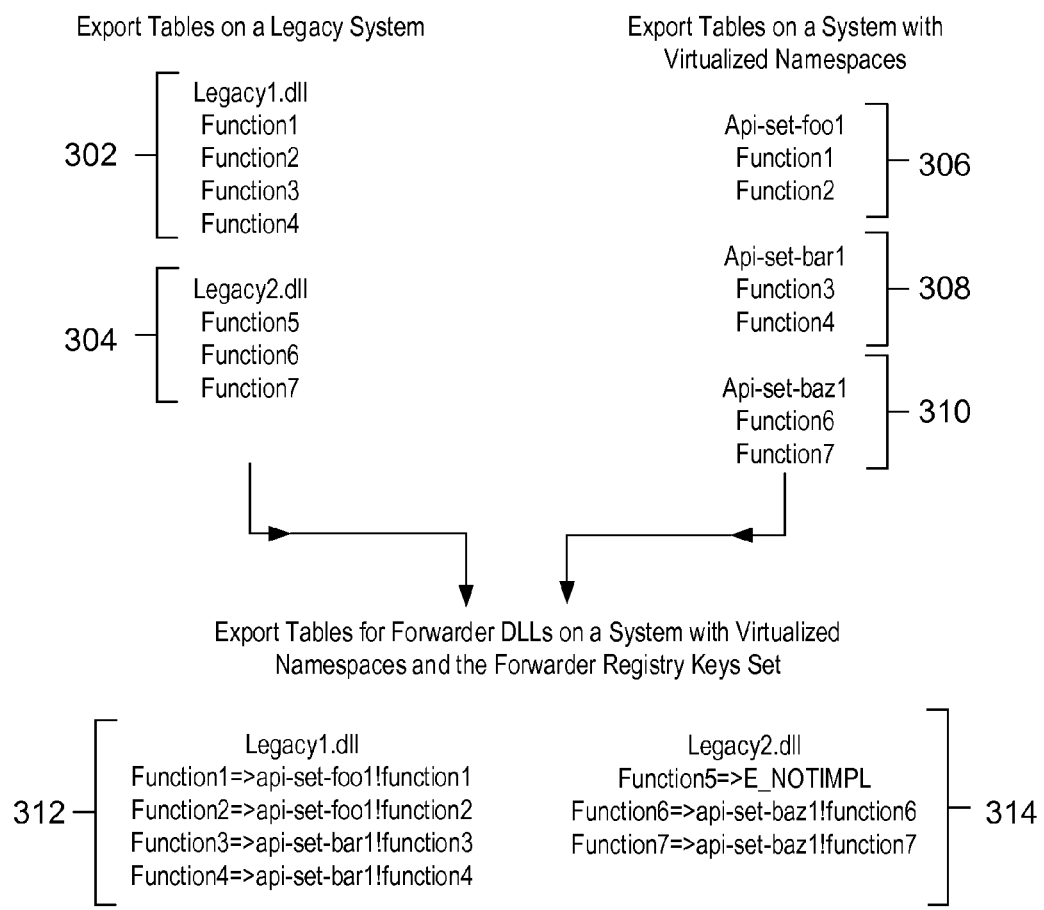
FIG. 3 is a block diagram illustrating generating a mapping binary file during a build of an operating system.

FIG. 3 is a block diagram illustrating generating a mapping binary file during a build of an operating system. The generating of the mapping binary file (also referred to as "reverse forwarder") can be implemented with any suitable computing device, such as the computing system 100 of FIG. 1.

A legacy system can include any suitable number of dynamically linked libraries such as legacy1.dll 302 and legacy2.dll 304. The legacy1.dll 302 and the legacy2.dll 304 can both include separate export tables that indicate the functions supported by each dynamically linked library. For example, legacy1.dll 302 can support functions 1, 2, 3, and 4, while legacy2.dll 304 can support functions 5, 6, and 7. However, the export tables of legacy1.dll 302 and legacy2.dll 304 are associated with function calls rather than application programming interface calls. Therefore, legacy1.dll 302 and legacy2.dll 304 are examples of legacy binary files.

Similarly, a system that supports virtualized namespaces can include any suitable number of dynamically linked libraries such as api-set-foo1 306, api-set-bar1 308, and api-set-baz1 310. The dynamically linked libraries api-set-foo1 306, api-set-bar1 308, and api-set-baz1 310 support virtualized namespaces and can load a function call based on an application programming interface name. The dynamically linked libraries api-set-foo1 306, api-set-bar1 308, and api-set-baz1 310 associate application programming interface names with supported functions. For example, api-set-foo1 306 supports functions 1 and 2, api-set-bar1 308 supports functions 3 and 4, and api-set-baz1 310 supports functions 6 and 7. The application programming interface names and the corresponding supporting functions can be stored in the export tables for the dynamically linked libraries api-set-foo1 306, api-set-bar1 308, and api-set-baz1 310.

The merged export table 312 for legacy1.dll 302 and merged export table 314 for legacy2.dll can include a mapping from a function call to a virtualized namespace. For example, function 1 of legacy1.dll 302 can be mapped to function 1 of api-set-foo1 306. Additionally, function 2 of legacy1.dll 302 can be mapped to function 2 of api-set-foo1 306, function 3 of legacy1.dll 302 can be mapped to function 3 of api-set-bar1, and function 4 of legacy1.dll 302 can be mapped to function 4 of api-set-bar1.

Regarding the mapped function calls of legacy2.dll, function 5 is not supported by the virtualized namespace binary files (api-set-foo1 306, api-set-bar1 308, and api-set-baz1 310). Therefore, the export table 314 for legacy2.dll can associate an error indicator with function 5 to indicate that function 5 is not implemented. However, function 6 of legacy2.dll can be mapped to function 6 of api-set-baz1 and function 7 of legacy2.dll can be mapped to function 7 of api-set-baz1. The merged export table 312 for legacy1.dll 302 and merged export table 314 for legacy2.dll can enable a legacy application or legacy binary file to perform function calls with virtualized namespace binary files.

Figure 4:
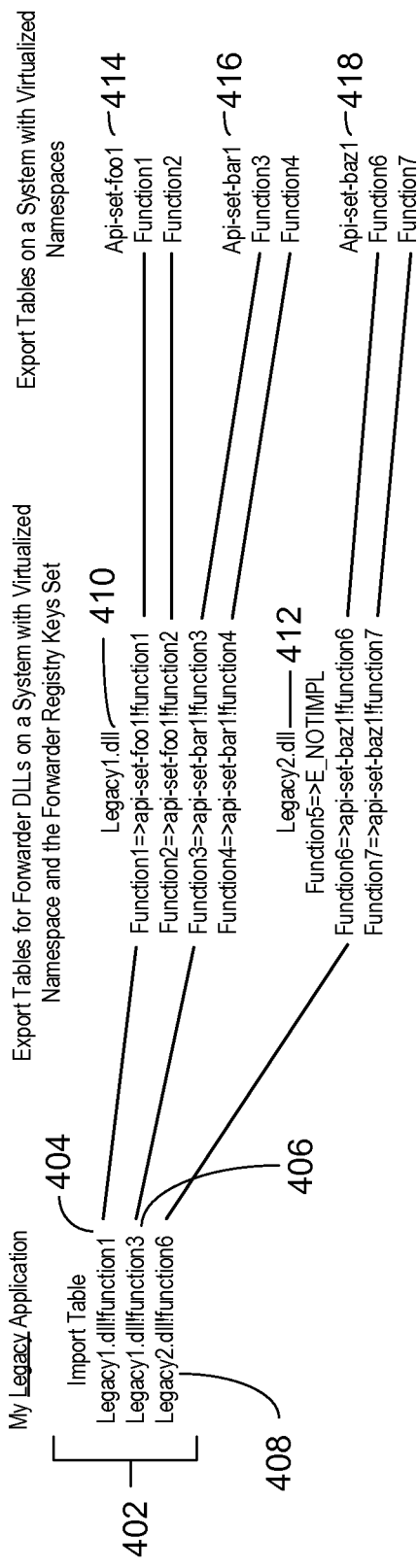
FIG. 4 is a block diagram illustrating loading a dynamically linked library that supports virtualized namespaces with a loader and no legacy dynamically linked libraries.

FIG. 4 is a block diagram illustrating loading a dynamically linked library that supports virtualized namespaces with a loader and no legacy dynamically linked libraries. The loading of the dynamically linked library that supports the virtualized namespaces can be implemented with any suitable computing system, such as the computing system 100 of FIG. 1 or computing system 700 of FIG. 7 described below.

In FIG. 4, a legacy application 402 can initiate any suitable number of function calls that are resolved during runtime. For example, the import table 402 of a legacy application can initiate function calls to function 1 of legacy1.dll 404, function 3 of legacy1.dll 406, and function 6 of legacy2.dll 408. In some examples, the function calls of the import table 402 of a legacy application can be mapped to a virtualized namespace using any number of mapping binary files such as legacy1.dll 410 and legacy2.dll 412. The mapping binary files (legacy1.dll 410 and legacy2.dll 412) can associate the function calls of the import table 402 of the legacy application with functions from an application programming interface in a virtualized namespace. For example, the mapping binary file legacy1.dll 410 can associate function 1 of legacy1.dll 404 with function 1 of api-set-foo1. The mapping binary file legacy1.dll 410 can also associate function 3 of legacy1.dll 406 with function 3 of api-set-bar1. Furthermore, the mapping binary file legacy2.dll 412 can associate function 6 of legacy2.dll 408 with function 6 of api-set-baz1.

During execution of the legacy application using import table 402, a loader can load functions from virtualized namespace binary files based on the mapping binary files legacy1.dll 410 and legacy2.dll 412. For example, function 1 of api-set-foo1 can be loaded from a virtualized namespace binary file named api-set-foo1 414. Similarly, function 3 of api-set-bar1 can be loaded from a virtualized namespace binary file named api-set-bar1 416 and function 6 of api-set-baz1 can be loaded from a virtualized namespace binary file named api-set-baz1 418. Thus, the mapping binary files legacy1.dll 410 and legacy2.dll 412 enable a legacy application to be executed on a system or operating system that implements virtualized namespaces using virtualized namespace binary files.

Figure 5:
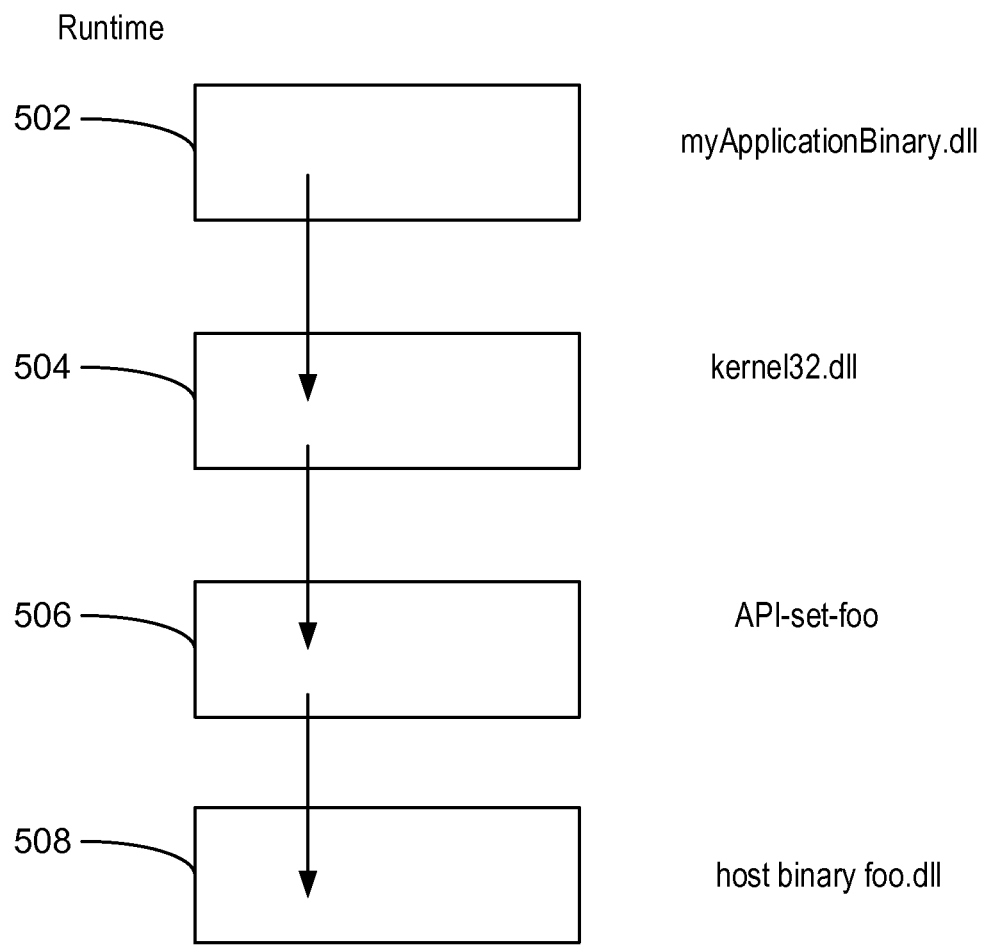
FIG. 5 is a block diagram depicting a runtime implementation of a process loading a dynamically linked library using a mapping binary file.

FIG. 5 is a block diagram depicting a runtime implementation of a process loading a dynamically linked library using a mapping binary file. The runtime implementation can be implemented with any suitable computing device such as computing system 100 of FIG. 1 or computing system 700 of FIG. 7 described below.

The runtime implementation of a process begins with a legacy binary file such as myapplicationbinary.dll 502. In some examples, myapplicationbinary.dll 502 can include any suitable number of function calls to additional dynamically linked libraries. For example, myapplicationbinary.dll 502 can include a function call to a second dynamically linked library such as kernel32.dll 504. If myapplicationbinary.dll 502 is a legacy binary file that does not support a virtualized namespace, myapplicationbinary.dll 502 relies on kernel32.dll to provide a mapping from a legacy function call to a virtualized namespace. Accordingly, kernel32.dll 504 can include a mapping or association between a function call from myapplicationbinary.dll 502 and a virtualized namespace such as API-set-foo 506. In some embodiments, a loader can then load the myapplicationbinary.dll 502 along with a host binaryfoo.dll 508 that includes the function call from myapplicationbinary.dll 502 in a virtualized namespace.

Figure 6:
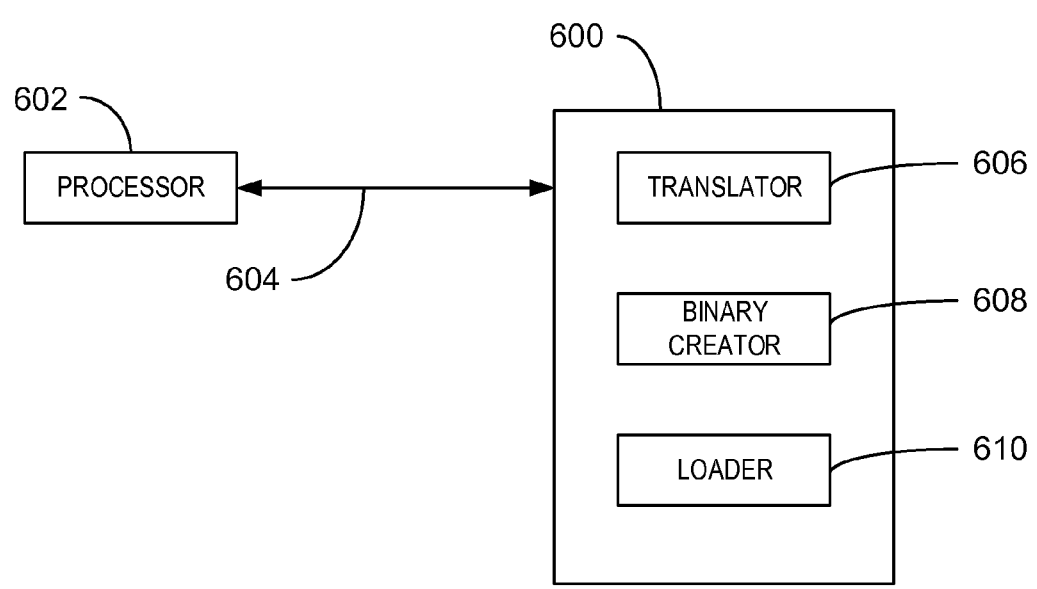
FIG. 6 is a block diagram of an example computer-readable storage media that can generate a mapping binary file.

FIG. 6 is a block diagram of an example computer-readable storage media that can generate a mapping binary file. The tangible, computer-readable storage media 600 may be accessed by a processor 602 over a computer bus 604. Furthermore, the tangible, computer-readable storage media 600 may include code to direct the processor 602 to perform the steps of the current method.

The various software components discussed herein may be stored on the tangible, computer-readable storage media 600, as indicated in FIG. 6. For example, the tangible computer-readable storage media 600 can include a translator 606, a binary creator 608, and a loader 610. In some embodiments, the translator 606 can map a function call from a legacy binary file to a function call from a virtualized namespace binary file. For example, the translator 606 can merge an export table from the legacy binary file and an export table from the virtualized namespace binary file. In some examples, merging the export table from the legacy binary file and the export table from the virtualized namespace binary file includes associating a function call from the legacy binary file with an application programming interface accessible by the virtualized namespace binary file.

The binary creator 608 can store the mapping of the function call from the legacy binary file to the function call from the virtualized namespace binary file in a mapping binary file. For example, the mapping or relationship between a function call from the legacy binary file and an application programming interface accessible by the virtualized namespace binary file can be stored in the mapping binary file. The binary creator 608 can also store, in the mapping binary file, an exception detected from the merger. For example, an exception may indicate that a function call in a legacy binary file is not associated with a virtualized namespace. In some examples, the loader 610 can store the mapping binary file in a storage location accessible by a loader. For example, a storage location, such as a file directory, can store any suitable number of mapping binary files. In some embodiments, the loader 610 can execute an application by loading the mapping binary file and a virtualized namespace binary file corresponding to the mapping binary file. It is to be understood that any number of additional software components not shown in FIG. 6 may be included within the tangible, computer-readable storage media 600, depending on the specific application.

FIG. 7 is a block diagram of an example of a computing system that can execute a process. The computing system 700 may be, for example, a mobile phone, laptop computer, desktop computer, or tablet computer, among others. The computing system 700 may include a processor 702 that is adapted to execute stored instructions, as well as a memory device 704 that stores instructions that are executable by the processor 702. The processor 702 can be a single core processor, a multi-core processor, a computing cluster, or any number of other configurations. The memory device 704 can include random access memory (e.g., SRAM, DRAM, zero capacitor RAM, SONOS, eDRAM, EDO RAM, DDR RAM, RRAM, PRAM, etc.), read only memory (e.g., Mask ROM, PROM, EPROM, EEPROM, etc.), flash memory, or any other suitable memory systems. The instructions that are executed by the processor 702 may be used to execute a process.

The processor 702 may be connected through a system bus 706 (e.g., PCI, ISA, PCI-Express, NuBus, etc.) to an input/output (I/O) device interface 608 adapted to connect the computing system 700 to one or more I/O devices 710. The I/O devices 710 may include, for example, a keyboard, a gesture recognition input device, a voice recognition device, and a pointing device, wherein the pointing device may include a touchpad or a touchscreen, among others. The I/O devices 710 may be built-in components of the computing system 700, or may be devices that are externally connected to the computing system 700.

The processor 702 may also be linked through the system bus 706 to a display device interface 712 adapted to connect the computing system 700 to a display device 714. The display device 714 may include a display screen that is a built-in component of the computing system 700. The display device 714 may also include a computer monitor, television, or projector, among others, that is externally connected to the computing system 700. A network interface card (NIC) 716 may also be adapted to connect the computing system 700 through the system bus 706 to a network (not depicted).

The storage 718 can include a hard drive, an optical drive, a USB flash drive, an array of drives, or any combinations thereof. The storage 718 may include a configurator 720, registry editor 722, and a loader 724. In some embodiments, the configurator 720 can store a registry value indicating a binary mapping directory. The registry editor 722 can detect the registry value by a loader. The loader 724 can search the binary mapping directory corresponding to the registry value when loading a process for execution. The loader 724 can also load the mapping binary file from the binary mapping directory into the process. Furthermore, the loader 724 can load a virtualized namespace binary file.

It is to be understood that the block diagram of FIG. 7 is not intended to indicate that the computing system 700 is to include all of the components shown in FIG. 7. Rather, the computing system 700 can include fewer or additional components not illustrated in FIG. 7 (e.g., additional applications, additional modules, additional memory devices, additional network interfaces, etc.). Furthermore, any of the functionalities of the configurator 720, registry editor 722, and loader 724 may be partially, or entirely, implemented in hardware and/or in the processor 702. For example, the functionality may be implemented with an application specific integrated circuit, in logic implemented in the processor 702, or in any other device.

Figure 8:
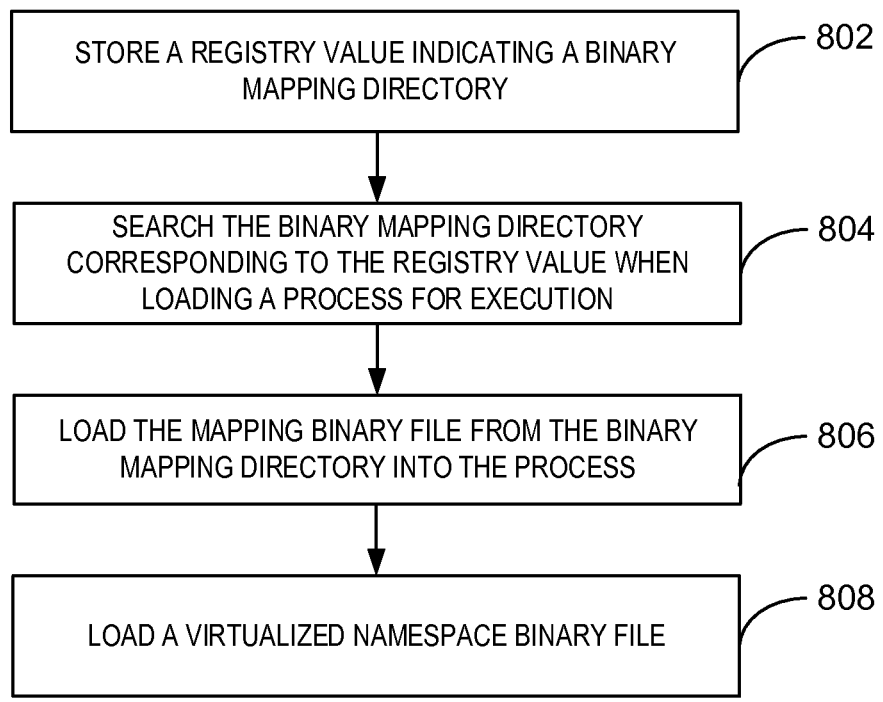
FIG. 8 is a process flow diagram of an example method for executing a process.

FIG. 8 is a process flow diagram of an example method for executing a process. The method 800 can be implemented with any suitable computing device such as the computing system 700 of FIG. 7.

At block 802, the configurator 720 can store a registry value indicating a binary mapping directory. In some embodiments, the binary mapping directory can store any suitable number of mapping binary files used by legacy applications to be executed in a virtualized namespace environment. The registry value can indicate the location or name of the binary mapping directory to enable a legacy application to locate mapping binary files.

At block 804, the loader 724 can search the binary mapping directory corresponding to the registry value when loading a process for execution. In some embodiments, the process can be a legacy application that does not support virtualized namespaces. The loader 724 can then search the binary mapping directory for a mapping binary file that includes a function call and an associated virtualized namespace.

At block 806, the loader 724 can load the mapping binary file from the binary mapping directory into the process. In some embodiments, as discussed above, the mapping binary file can enable a legacy application to execute a function call using a virtualized namespace binary file. For example, the mapping binary file can indicate a virtualized namespace binary file to be loaded along with the process based on a function call in the process.

At block 808, the loader 724 can load a virtualized namespace binary file corresponding to the mapping binary file. The loader 724 can load the virtualized namespace binary file to enable the process to be executed. As shown above, the virtualized namespace binary file can include the function of an application programming interface that corresponds to a function call from the process or legacy application.

In one embodiment, the process flow diagram of FIG. 8 is intended to indicate that the steps of the method 800 are to be executed in a particular order. Alternatively, in other embodiments, the steps of the method 800 can be executed in any suitable order and any suitable number of the steps of the method 800 can be included. Further, any number of additional steps may be included within the method 800, depending on the specific application. For example, the loader 724 can also add the binary mapping directory to a loader path. The loader path, as referred to herein, can include a location in storage with any suitable number of directories in which the loader 724 is to detect virtualized namespace binary files and mapping binary files to load. In some embodiments, the loader 724 can infer a name for the virtualized namespace binary file based on a target operating system.

FIG. 9 is a block diagram of an example of a computing system that can implement namespace virtualization with a legacy application. The computing system 900 may be, for example, a mobile phone, laptop computer, desktop computer, or tablet computer, among others. The computing system 900 may include a processor 902 that is adapted to execute stored instructions, as well as a memory device 904 that stores instructions that are executable by the processor 902. The processor 902 can be a single core processor, a multi-core processor, a computing cluster, or any number of other configurations. The memory device 904 can include random access memory (e.g., SRAM, DRAM, zero capacitor RAM, SONOS, eDRAM, EDO RAM, DDR RAM, RRAM, PRAM, etc.), read only memory (e.g., Mask ROM, PROM, EPROM, EEPROM, etc.), flash memory, or any other suitable memory systems. The instructions that are executed by the processor 902 may be used to implement namespace virtualization with a legacy application.

The processor 902 may be connected through a system bus 906 (e.g., PCI, ISA, PCI-Express, NuBus, etc.) to an input/output (I/O) device interface 908 adapted to connect the computing system 900 to one or more I/O devices 910. The I/O devices 910 may include, for example, a keyboard, a gesture recognition input device, a voice recognition device, and a pointing device, wherein the pointing device may include a touchpad or a touchscreen, among others. The I/O devices 910 may be built-in components of the computing system 900, or may be devices that are externally connected to the computing system 900.

The processor 902 may also be linked through the system bus 906 to a display device interface 912 adapted to connect the computing system 900 to a display device 914. The display device 914 may include a display screen that is a built-in component of the computing system 900. The display device 914 may also include a computer monitor, television, or projector, among others, that is externally connected to the computing system 900. A network interface card (NIC) 916 may also be adapted to connect the computing system 900 through the system bus 906 to a network (not depicted).

The storage 918 can include a hard drive, an optical drive, a USB flash drive, an array of drives, or any combinations thereof. The storage 918 may include a binary executable 920 and a loader 922. In some embodiments, loader 922 can detect that an interface contract in a legacy application is to be resolved. An interface contract, as referred to herein, can include any suitable reference to a function that resides in a binary file such as a dynamically linked library. A legacy application, as referred to herein, includes any application which identifies functions to be loaded using a legacy reference import table. Since legacy applications access functions in binary files through a legacy reference import table, the legacy applications have been unable to implement namespace virtualization.

In some embodiments, the binary executable 920 can detect an import table associated with the interface contract from a plurality of import tables. For example, the binary executable 920 can detect that an import table exists for a legacy application and an import table exists for applications that support namespace virtualization. In some embodiments, the loader 922 can select the import table to be used for the interface contract based on an interface name and/or a legacy binary indicator stored in an import table. The legacy binary indicator can indicate that the interface contract to be resolved resides in a legacy binary file. If the legacy binary indicator is not selected, the loader 922 can detect that the interface contract to be resolved resides in an application that supports namespace virtualization.

In some embodiments, the loader 922 can also link functions from one or more dynamically linked libraries identified from the selected import table to the legacy application to generate an executable file. For example, the loader 922 can link functions from a legacy binary or a binary that supports namespace virtualization to a legacy application. In some examples, the legacy application is not relinked. Rather, the legacy application can access a binary file that supports namespace virtualization by a mapping of the legacy import table to the import table that supports namespace virtualization.

It is to be understood that the block diagram of FIG. 9 is not intended to indicate that the computing system 900 is to include all of the components shown in FIG. 9. Rather, the computing system 900 can include fewer or additional components not illustrated in FIG. 9 (e.g., additional applications, additional modules, additional memory devices, additional network interfaces, etc.). Furthermore, any of the functionalities of the binary executable 920 and the loader 922 may be partially, or entirely, implemented in hardware and/or in the processor 902. For example, the functionality may be implemented with an application specific integrated circuit, in logic implemented in the processor 902, or in any other device.

Figure 10:
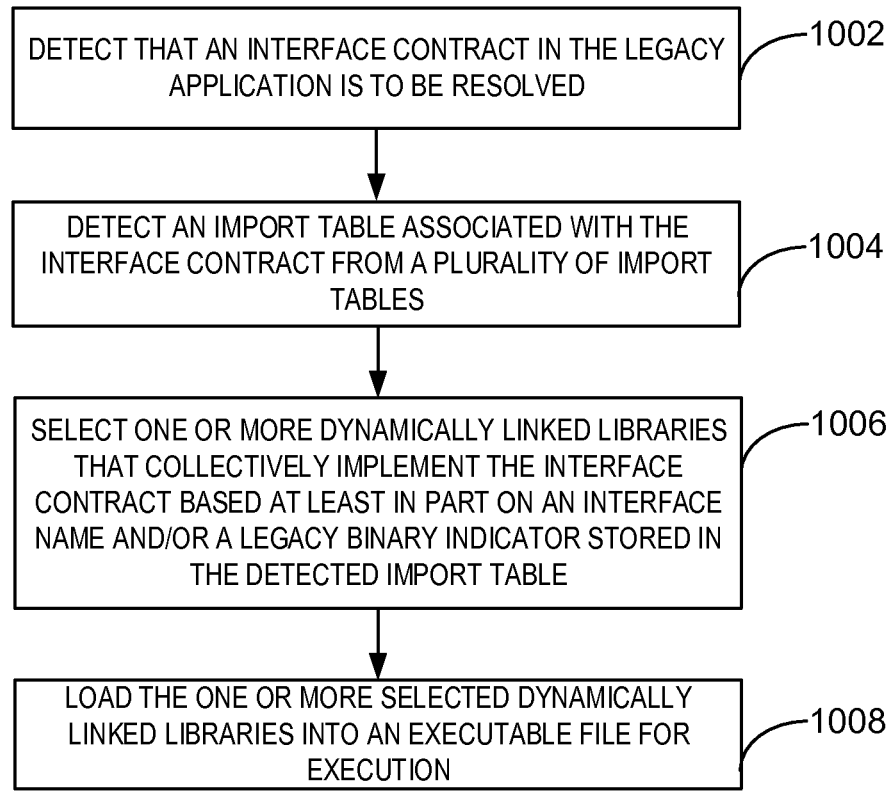
FIG. 10 is a process flow diagram of an example method that can implement namespace virtualization with a legacy application.

FIG. 10 is a process flow diagram of an example method can implement namespace virtualization with a legacy application. The method 1000 can be implemented with any suitable computer device such as the computing system 900 of FIG. 9.

At block 1002, the loader 922 can detect that an interface contract in the legacy application is to be resolved. As discussed above, an interface contract can include any suitable reference to a function that resides in or is implemented by a binary file such as a dynamically linked library. In some examples, a legacy application can include any suitable number of interface contracts. A legacy application can be any application which identifies functions to be included in an executable file without accessing an application program interface (also referred to as "API"). For example, a legacy application may not support namespace virtualization, which enables an application to load functions from a binary file using an API name. Rather, a legacy application may load functions from a binary file using a reference to a function name located in the binary file.

At block 1004, the binary executable 920 can detect an import table associated with the interface contract from a plurality of import tables. For example, the binary executable 920 can detect that an import table exists for a legacy application and an import table exists for applications that support namespace virtualization. In some embodiments, the binary executable 920 can generate the import table that supports namespace virtualization, which can include an interface name, a supported binary interface standard, and the like. The binary interface standard can be a component object model, among others.

In some examples, the binary executable 920 for a legacy application can map a function in a dynamically linked library that does not support namespace virtualization to a function in a dynamically linked library that does support namespace virtualization. In some embodiments, the detected import table comprises a mapping value indicating a relationship between a legacy reference namespace and a virtual namespace. An example of the mapping of a function from an import table that does not provide namespace virtualization to an import table that does provide namespace virtualization is included below in relation to FIG. 11.

At block 1006, the loader 922 can select one or more dynamically linked libraries that collectively implement the interface contract based at least in part on an interface name and/or a legacy binary indicator stored in the detected import table. The legacy binary indicator can indicate that the interface contract to be resolved resides in a legacy binary. For example, the legacy binary can be a dynamically linked library that supports function calls based on a reference name. If the legacy binary indicator is not selected, the loader 922 can detect that the interface contract to be resolved resides in a binary file that supports namespace virtualization. For example, the binary file that supports namespace virtualization can support function calls based on an API name. In some examples, one or more dynamically linked libraries include system binaries and virtualized namespace binaries, and system binaries have precedence over virtualized namespace binaries.

At block 1008, the loader 922 can load the one or more selected dynamically linked libraries into an executable file for execution. The loader 922 can also link functions from one or more dynamically linked libraries identified from the selected import table to the legacy application to generate an executable file. For example, the loader 922 can load any suitable number of dynamically linked libraries that include function calls from a legacy application into an executable file. In some embodiments, the loader 922 can also load dynamically linked libraries that depend from previously loaded dynamically linked libraries. For example, the loader 922 can load dynamically linked libraries that are included in function calls in previously loaded dynamically linked libraries.

In one embodiment, the process flow diagram of FIG. 10 is intended to indicate that the steps of the method 1000 are to be executed in a particular order. Alternatively, in other embodiments, the steps of the method 1000 can be executed in any suitable order and any suitable number of the steps of the method 1000 can be included. Further, any number of additional steps may be included within the method 1000, depending on the specific application. For example, a selector can detect a delay load table and modify the delay load table to include an API set-aware value and a relative virtual address corresponding to the API interface name. In some embodiments, the delay load descriptor corresponding to the delay load table can be modified so that a delay load table can indicate a relative virtual address of an interface corresponding to a virtualized namespace. In some embodiments, the delay load descriptor can also include an indicator that a virtualized namespace is supported by the application loading functions using the delay load table. The indicator and the relative virtual address of an interface corresponding to a virtualized namespace can be stored and transmitted via any suitable delay load descriptor. In some examples, the delay load descriptor can be any suitable data structure and can include additional information such as a relative virtual address of a dynamically linked library, a relative virtual address of a module handle, a relative virtual address of an import address table, a relative virtual address of an import name table, a relative virtual address of a bound import address table, a relative virtual address of an unload information table, and a time stamp, among others.

Figure 11:
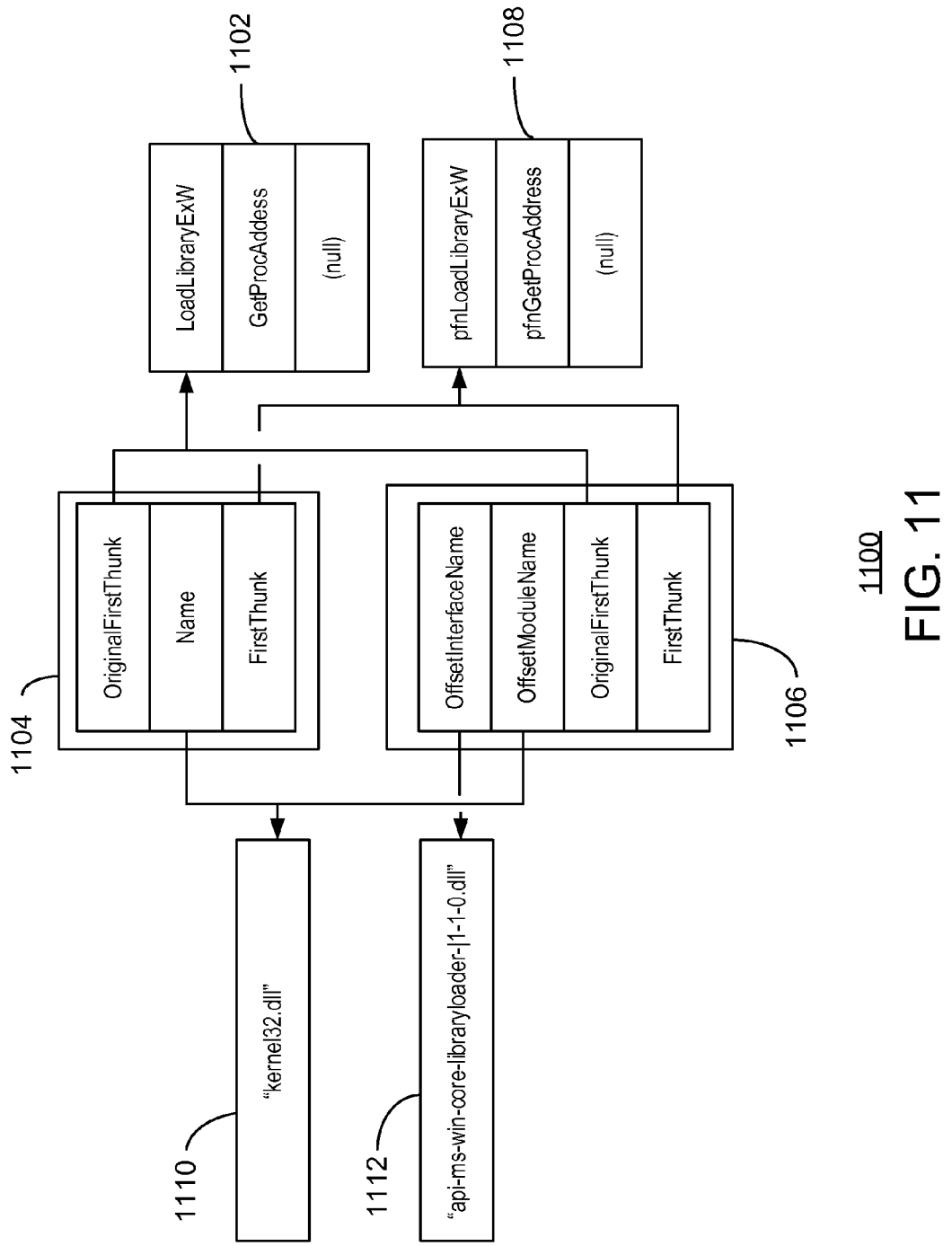
FIG. 11 is a block figure diagram illustrating an example system implementation of namespace virtualization with a legacy application.

FIG. 11 is a block figure diagram illustrating an example system implementation of namespace virtualization with a legacy application. The implementation of FIG. 11 can be implemented with the computing device 900 of FIG. 9.

An example legacy application function call 1102 is depicted as Load_Library_EX_W (also referred to as the "example legacy function call"). The example legacy function call 1102 can also include additional parameters such as Getprocaddress .and a null value. In some embodiments, the loader 922 can detect an import descriptor corresponding to the example legacy function call 1102. The import descriptor may not indicate if a legacy import table 1104 or a virtualized import table 1106 includes the information corresponding to the binary file with the legacy function 1110 (e.g. kernel32.dll).

An example virtualized namespace function call 1108 is depicted as "pfnload_library_EW_W" (also referred to as the "example virtualized function call"). The example virtualized function call 1108 can also include additional parameters such as "pfn_Getprocaddress" and a null value. In some embodiments, the loader 922 can detect the example virtualized function call 1108 and use a corresponding virtualized import table 1106 to determine a binary file that includes the virtualized function call. For example, the loader 922 can detect an import descriptor corresponding to the virtualized function call 1108 that indicates a virtualized import table 1106 is to be used to determine the binary file including the virtualized function 1112 (e.g. api-ms-win-core-libraryloader-1-1-0.dll).

In some embodiments, the virtualized import table 1106 or the legacy import table 1104 are selected based on relative virtual addresses provided in an import descriptor data. For example, the import descriptor data may include a relative virtual address to an import address table that corresponds to dynamically linked libraries that do not support namespace virtualization. Alternatively, the import descriptor may include a relative virtual address that corresponds to dynamically linked libraries that do support namespace virtualization as well as dynamically linked libraries that do not support namespace virtualization. In some examples, the detected import table comprises a versioning value or a size of a descriptor structure. The loader 922 can use the versioning value or the size of the descriptor can to determine the appropriate import table 1104 or 1106 that includes the information pertaining to the corresponding dynamically linked library. In some embodiments, the import tables 1104 and 1106 can also indicate that system dynamically linked libraries take precedence over dynamically linked libraries referenced by an import table. In some embodiments, a mapping of the namespace from a legacy import table to the virtualized import table is inferred from the API namespace of the target operating system and generated automatically. In certain configurations, some APIs in the reference namespace may not present in the virtualized namespace. In this case, the loader 922 can provide a substitute implementation for the missing APIs.

It is to be understood that the block diagram of FIG. 11 is not intended to indicate that the implementation of namespace virtualization with a legacy application is to include all of the components shown in FIG. 11. Rather, the system 1100 can include fewer or additional components not illustrated in FIG. 11 (e.g., additional applications, additional modules, additional memory devices, additional network interfaces, etc.). For example, the system 1100 can also include a compiler with a linker that generates the virtualized import table 1106.

Figure 12:
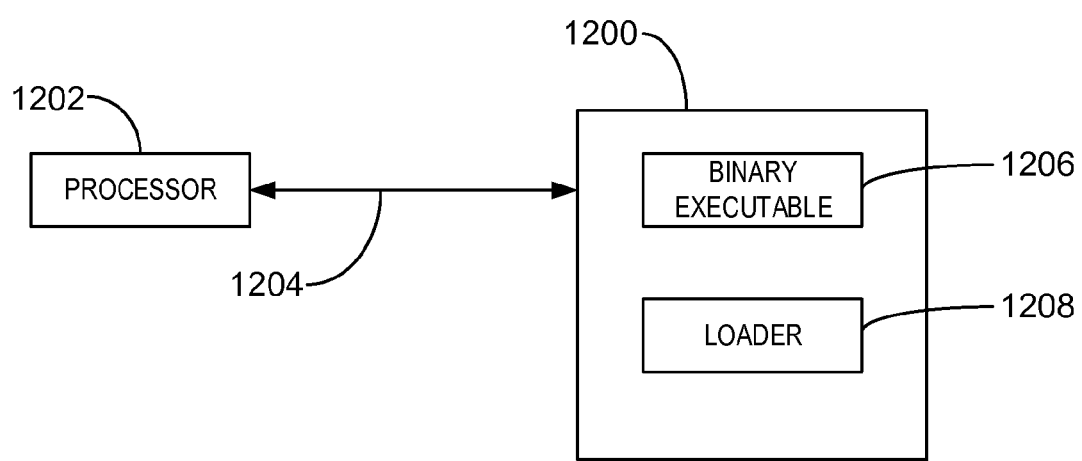
FIG. 12 is a block diagram of an example computer-readable storage media that can implement namespace virtualization with a legacy application.

FIG. 12 is a block diagram showing a tangible, computer-readable storage media that can implement namespace virtualization with a legacy application. The tangible, computer-readable storage media 1200 may be accessed by a processor 1202 over a computer bus 1204. Furthermore, the tangible, computer-readable storage media 1200 may include code to direct the processor 1202 to perform the steps of the current method.

The various software components discussed herein may be stored on the tangible, computer-readable storage media 1200, as indicated in FIG. 12. For example, the tangible computer-readable storage media 1200 can include a binary executable 1206 and a loader 1208. The loader 1208 can, in some embodiments, detect that an interface contract in a legacy application is to be resolved. Since legacy applications access binary files through a legacy reference import table, the legacy applications have been unable to implement namespace virtualization.

In some embodiments, a binary executable 1206 can detect an import table associated with the interface contract from a plurality of import tables. For example, the binary executable 1206 can detect that an import table exists for a legacy application and an import table exists for applications that support namespace virtualization. In some embodiments, the loader 1208 can select the import table to be used for the interface contract based on an interface name and/or a legacy binary indicator stored in an import table. The legacy binary indicator can indicate that the interface contract to be resolved resides in a legacy binary file. If the legacy binary indicator is not selected, the loader 1208 can detect that the interface contract to be resolved resides in an application that supports namespace virtualization.

In some embodiments, the loader 1208 can link functions from one or more dynamically linked libraries identified from the selected import table to the legacy application to generate an executable file. For example, the loader 1208 can link functions from a legacy binary or a binary that supports namespace virtualization to a legacy application. In some examples, the legacy application is not relinked. Rather, the legacy application can access a binary file that supports namespace virtualization by a mapping of the legacy import table to the import table that supports namespace virtualization.

It is to be understood that any number of additional software components not shown in FIG. 12 may be included within the tangible, computer-readable storage media 1200, depending on the specific application. Although the subject matter has been described in language specific to structural features and/or methods, it is to be understood that the subject matter defined in the appended claims is not necessarily limited to the specific structural features or methods described above. Rather, the specific structural features and methods described above are disclosed as example forms of implementing the claims.

Example 1

An embodiment provides a system for generating a mapping binary file comprising a translator to map a function call from a legacy binary file to a function call from a virtualized namespace binary file by merging an export table from the legacy binary file and an export table from the virtualized namespace binary file. The system can also include a binary creator to store the mapping of the function call from the legacy binary file to the function call from the virtualized namespace binary file in a mapping binary file and store, in the mapping binary file, an exception detected from the merger of the export tables. Furthermore, the loader can store the mapping binary file in a storage location accessible by a loader.

Alternatively, or in addition, the system can include a builder to detect a build file that enables the mapping. Alternatively, or in addition, the translator can also detect a second function call to be mapped from the legacy binary file to the virtualized namespace binary file, determine that the mapping of the second function call does not exist, and generate a substitute implementation for the second function call. Alternatively, or in addition, the loader can also detect a precedential binary file ordering, wherein the precedential binary file ordering indicates a system binary file is to be loaded prior to the mapping binary file.

Example 2

Another embodiment provides a method for generating a mapping binary file comprising mapping a function call from a legacy binary file to a function call from a virtualized namespace binary file using a builder to detect a build file that enables the mapping, the mapping comprising merging an export table from the legacy binary file and an export table from the virtualized namespace binary file. The method can also include storing the mapping of the function call from the legacy binary file to the function call from the virtualized namespace binary file in a mapping binary file and storing, in the mapping binary file, an exception detected from the combination. Furthermore, the method can include storing the mapping binary file in a storage location accessible by a loader.

Alternatively, or in addition, the method can include detecting a second function call to be mapped from the legacy binary file to the virtualized namespace binary file, determining that the mapping of the second function call does not exist, and generating a substitute implementation for the second function call. Alternatively, or in addition, the method can also include detecting a precedential binary file ordering, wherein the precedential binary file ordering indicates a system binary file is to be loaded prior to the mapping binary file.

Example 3

Additionally, an embodiment provides one or more computer-readable storage media for generating a mapping binary file comprising a plurality of instructions that, when executed by a processor, cause the processor to map a function call from a legacy binary file to a function call from a virtualized namespace binary file by merging an export table from the legacy binary file and an export table from the virtualized namespace binary file. The plurality of instructions, when executed by the processor, also cause the processor to store the mapping of the function call from the legacy binary file to the function call from the virtualized namespace binary file in a mapping binary file and store, in the mapping binary file, an exception detected from the combination. Furthermore, the plurality of instructions that, when executed by a processor, cause the processor to store the mapping binary file in a binary mapping directory accessible by a loader along with a registry value indicating a location of the binary mapping directory.

Alternatively, or in addition, the plurality of instructions that, when executed by a processor, can also cause the processor to detect a second function call to be mapped from the legacy binary file to the virtualized namespace binary file, determine that the mapping of the second function call does not exist, and generate a substitute implementation for the second function call. Alternatively, or in addition, the plurality of instructions that, when executed by a processor, can also cause the processor to detect a precedential binary file ordering, wherein the precedential binary file ordering indicates a system binary file is to be loaded prior to the mapping binary file.

Example 4

Another embodiment provides a system for executing a process comprising a configurator to store a registry value indicating a binary mapping directory. The system also includes a loader to search the binary mapping directory corresponding to the registry value when loading a process for execution and load the mapping binary file from the binary mapping directory into the process. The loader can also load a virtualized namespace binary file.

Alternatively, or in addition, the loader can add the binary mapping directory to a loader path. Alternatively, or in addition, the loader can infer a name for the virtualized namespace binary file based on a target operating system.

Example 5

In yet another embodiment, a method for executing a process comprises storing a registry value indicating a binary mapping directory and searching the binary mapping directory corresponding to the registry value when loading a process for execution. The method also includes loading the mapping binary file from the binary mapping directory into the process, and loading a virtualized namespace binary file corresponding to the mapping binary file.

Alternatively, or in addition, the method can include adding the binary mapping directory to a loader path. Alternatively, or in addition, the method can include inferring a name for the virtualized namespace binary file based on a target operating system.

Example 6

Furthermore, another embodiment provides a system for implementing namespace virtualization with a legacy application comprising a loader to detect that an interface contract in the legacy application is to be resolved. The system also includes a binary executable to detect an import table associated with the interface contract from a plurality of import tables. In addition, the loader can select one or more dynamically linked libraries that collectively implement the interface contract based at least in part on an interface name and/or a legacy binary indicator stored in the detected import table and load the one or more selected dynamically linked libraries into an executable file for execution.

Alternatively, or in addition, the loader can generate one of the plurality of import tables based on a virtualized namespace. Alternatively, or in addition, the one or more dynamically linked libraries can include system binaries and virtualized namespace binaries, wherein system binaries have precedence over virtualized namespace binaries. Alternatively, or in addition, the import table can include a parameter indicating a binary interface standard such as a component object model. Alternatively, or in addition, the detected import table can include a mapping value indicating a relationship between a legacy reference namespace and a virtual namespace. Alternatively, or in addition, the executable file can include a legacy reference namespace and a virtual namespace. Alternatively, or in addition, the detected import table can include a versioning value or a size of a descriptor structure. Alternatively, or in addition, the system can include a selector to detect a delay load table, and modify the delay load table to include an API set-aware value and a relative virtual address corresponding to the API interface name.

Example 7

Moreover, another embodiment provides a method for implementing namespace virtualization with a legacy application comprising detecting that an interface contract in a legacy binary file corresponding to the legacy application is to be resolved. The method also includes detecting an import table associated with the interface contract from a plurality of import tables and selecting one or more dynamically linked libraries that collectively implement the interface contract based at least in part on an interface name and/or a legacy binary indicator stored in the detected import table. Furthermore, the method includes loading a function in the interface contract from the one or more selected dynamically linked libraries, the function being loaded into an executable file for execution.

Alternatively, or in addition, the method can include generating one of the plurality of import tables based on a virtualized namespace. Alternatively, or in addition, the one or more dynamically linked libraries can include system binaries and virtualized namespace binaries, wherein system binaries have precedence over virtualized namespace binaries. Alternatively, or in addition, the import table can include a parameter indicating a binary interface standard such as a component object model. Alternatively, or in addition, the detected import table can include a mapping value indicating a relationship between a legacy reference namespace and a virtual namespace. Alternatively, or in addition, the executable file can include a legacy reference namespace and a virtual namespace. Alternatively, or in addition, the detected import table can include a versioning value or a size of a descriptor structure. Alternatively, or in addition, the method can include detecting a delay load table, and modifying the delay load table to include an API set-aware value and a relative virtual address corresponding to the API interface name.

What is claimed is:

1. A system for generating a mapping binary file, comprising a processor to:
    map a function call from a legacy binary file to a function call from a virtualized namespace binary file by merging an export table from the legacy binary file and an export table from the virtualized namespace binary file, the virtualized namespace binary file to load the function call based on an application programming interface name;
    store the mapping of the function call from the legacy binary file to the function call from the virtualized namespace binary file in a mapping binary file;
    store, in the mapping binary file, an exception detected from the merger of the export tables; store the mapping binary file in a storage location accessible by a loader; and
    implement a precedential binary file ordering to indicate that a system binary file is to be loaded prior to the mapping binary file in response to detecting the precedential binary file ordering.

2. The system of claim 1, wherein the processor is to detect a build file that enables the mapping.

3. The system of claim 1, wherein the processor is to:
    detect a second function call to be mapped from the legacy binary file to the virtualized namespace binary file;
    determine that the mapping of the second function call does not exist; and
    generate a substitute implementation for the second function call.

4. A method for generating a mapping binary file, comprising:
    mapping a function call from a legacy binary file to a function call from a virtualized namespace binary file using a builder to detect a build file that enables the mapping, the mapping comprising merging an export table from the legacy binary file and an export table from the virtualized namespace binary file, the virtualized namespace binary file to load the function call based on an application programming interface name;
    storing the mapping of the function call from the legacy binary file to the function call from the virtualized namespace binary file in a mapping binary file;
    storing, in the mapping binary file, an exception detected from merging the export tables;
    storing the mapping binary file in a storage location accessible by a loader; and
    implementing a precedential binary file ordering to indicate that a system binary file is to be loaded prior to the mapping binary file in response to detecting the precedential binary file ordering.

5. The method of claim 4, further comprising:
    detecting a second function call to be mapped from the legacy binary file to the virtualized namespace binary file;
    determining that the mapping of the second function call does not exist; and
    generating a substitute implementation for the second function call.

6. One or more computer-readable storage devices for generating a mapping binary file comprising a plurality of instructions that, when executed by a processor, cause the processor to:
    map a function call from a legacy binary file to a function call from a virtualized namespace binary file by merging an export table from the legacy binary file and an export table from the virtualized namespace binary file, the virtualized namespace binary file to load the function call based on an application programming interface name;
    store the mapping of the function call from the legacy binary file to the function call from the virtualized namespace binary file in a mapping binary file;

store, in the mapping binary file, an exception detected from merging the export tables;

store the mapping binary file in a binary mapping directory accessible by a loader along with a registry value indicating a location of the binary mapping directory; and implement a precedential binary file ordering indicating a system binary file is to be loaded prior to the mapping binary file in response to detecting the precedential binary file ordering.

7. A system for implementing namespace virtualization with a legacy application, comprising a processor to:

detect an import table associated with an interface contract from a plurality of import tables; and detect that an interface contract in the legacy application is to be resolved, to select one or more dynamically linked libraries that collectively implement the interface contract based at least in part on an interface name and/or a legacy binary indicator stored in the detected import table, and to load the one or more selected dynamically linked libraries into an executable file for execution, wherein the one or more selected dynamically linked libraries are comprised of system binary files and virtualized namespace binary files, and wherein the loading comprises implementing a precedential binary file ordering indicating the system binary files are to be loaded prior to the virtualized namespace binary files in response to detecting the precedential binary file ordering, and wherein the processor is to generate one of the plurality of import tables based on a virtualized namespace, the virtualized namespace to load a function call based on an application programming interface name.

8. The system of claim 7, the import table comprising a parameter indicating a binary interface standard.

9. The system of claim 8, the binary interface standard being a component object model.

10. The system of claim 7, the detected import table comprising a mapping value indicating a relationship between a legacy reference namespace and the virtual namespace.

11. The system of claim 7, the executable file comprising a legacy reference namespace and the virtual namespace.

12. The system of claim 7, the detected import table comprising a versioning value or a size of a descriptor structure.

13. The system of claim 7, wherein the processor is to detect a delay load table, and to modify the delay load table to include an API set-aware value and a relative virtual address corresponding to the API interface name.

14. A method for implementing namespace virtualization with a legacy application, comprising:

detecting that an interface contract in a legacy binary file corresponding to the legacy application is to be resolved;

detecting an import table associated with the interface contract from a plurality of import tables, wherein one of the plurality of import tables is generated based on a virtualized namespace;

selecting one or more dynamically linked libraries that collectively implement the interface contract based at least in part on an interface name and/or a legacy binary indicator stored in the detected import table, the one or more dynamically linked libraries comprising system binaries and virtualized namespace binaries, the system binaries having precedence over the virtualized namespace binaries based on a precedential binary file ordering that indicates the system binaries are to be loaded prior to the virtualized namespace binaries, and wherein the virtualized namespace binaries load a function call based on an application programming interface name; and loading a function in the interface contract from the one or more selected dynamically linked libraries, the function being loaded into an executable file for execution.

15. The method of claim 14, the import table comprising a parameter indicating a binary interface standard.

16. The method of claim 15, the binary interface standard being a component object model.

* * * * *